United States Patent
Bowen et al.

(10) Patent No.: US 6,296,043 B1
(45) Date of Patent: *Oct. 2, 2001

(54) SPRAYCAST METHOD AND ARTICLE

(75) Inventors: Kim E. Bowen, Whitehall; Douglas S. Potter, Montague; David A. Cook, Hart; David P. Ingersoll, Montaque; Jack W. van Heest, Twin Lake; Ranes P. Dalal, N. Muskegon, all of MI (US)

(73) Assignee: Howmet Research Corporation, Whitehall, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/763,009

(22) Filed: Dec. 10, 1996

(51) Int. Cl.[7] .............. B22D 23/00; B22D 27/15; B22D 11/16

(52) U.S. Cl. .............. 164/46; 164/61; 164/66.1; 164/154.4; 164/154.8; 164/155.3; 164/155.6

(58) Field of Search .............. 164/46, 271, 272, 164/61, 65, 66.1, 154.6, 155.6, 155.3, 154.8

(56) References Cited

U.S. PATENT DOCUMENTS

| | | |
|---|---|---|
| Re. 31,767 | 12/1984 | Brooks . |
| 2,639,490 * | 5/1953 | Brennan .............. 29/17.2 |
| 3,826,301 | 7/1974 | Brooks . |
| 3,970,249 | 7/1976 | Singer .............. 239/102 |
| 4,064,295 | 12/1977 | Singer .............. 427/424 |
| 4,066,117 | 1/1978 | Clark et al. . |
| 4,420,441 | 12/1983 | Singer .............. 264/7 |
| 4,477,291 | 10/1984 | Singer .............. 148/11.5 |
| 4,579,168 | 4/1986 | Singer .............. 164/480 |
| 4,657,787 | 4/1987 | Signer et al. .............. 427/319 |
| 4,681,258 | 7/1987 | Jenkins et al. .............. 293/66 |
| 4,738,712 | 4/1988 | Singer .............. 75/0.5 |
| 4,779,802 | 10/1988 | Coombs . |
| 4,804,034 | 2/1989 | Leathm et al. .............. 164/46 |
| 4,830,084 | 5/1989 | Singer . |
| 4,905,899 | 3/1990 | Coombs et al. . |
| 4,926,923 * | 5/1990 | Brooks et al. .............. 164/46 |
| 4,926,924 * | 5/1990 | Brooks et al. .............. 614/46 |
| 4,938,275 | 7/1990 | Leatham et al. . |
| 5,110,631 | 5/1992 | Leathm et al. .............. 427/422 |
| 5,143,139 * | 9/1992 | Leatham et al. .............. 164/46 |
| 5,669,433 * | 9/1997 | Sterett et al. .............. 164/46 |

OTHER PUBLICATIONS

Sprayforming (Process developments for titanium alloys); Materials Information, The Institute of Metals, London; Abstract.

The Spray Forming fo Superalloys; 1208 J. of Metals, 39 Aug. (1987), No. 8, Fiedler, Sawyer, Kopp and Leatham, pp. 28–33.

* cited by examiner

Primary Examiner—Nam Nguyen
Assistant Examiner—I.-H. Lin (57) ABSTRACT

Spraycasting method involves directing an atomized metal or alloy spray at a collector disposed in a spray chamber and controlling temperature of the spray in flight in the spray chamber and of the atomized metal or alloy as it is deposited on the collector by a spray chamber pressure control technique that involves in-situ evacuation of the spray chamber during spray deposition to a maintain spray chamber gas partial pressure less than about 400 torr. Such low spray chamber gas partial pressure provides a higher temperature of the atomized spray in flight in the spray chamber and of the sprayed material as it is deposited on a collector in the spray chamber effective to reduce deposit porosity, reduce grain layering or banding, and provide a uniform grain through the thickness of the deposit.

15 Claims, 11 Drawing Sheets

S/N A2-546, 730 TORR PROCESSED
FIG. 4B1

ASTM 6.5 GRAIN SIZE / 2.1% POROSITY
FIG. 4B2

S/N A2-580, 400 TORR PROCESSED
FIG. 4A1

ASTM 6.5 GRAIN SIZE / 0.9% POROSITY
FIG. 4A2

START  FIG. 8A

START  FIG. 8B

FIG. 9A

SPRAYCAST METHOD AND ARTICLE

FIELD OF THE INVENTION

The present invention relates to spraycasting of an atomized molten metal or alloy onto a collector to form a spray deposit with reduced porosity and improved microstructure.

BACKGROUND OF THE INVENTION

A spraycast method is described in U.S. Pat. No. 3,826,301 that involves atomizing a molten metal or alloy and directing the atomized spray onto a collector surface disposed in a spray chamber to form an article. The spray chamber typically is maintained at atmopsheric pressure of argon or other non-reactive gas therein while the molten spray is directed onto the collector.

U.S. Pat. No. 3,826,921, now Reissue 31,767, describes control of the temperature of the spray deposit independent of the temperature of a mold in which an atomized spray is directed to control the structure of the sprayed deposit. To this end, the patent focuses on the conditions of gas atomization of the molten metal or alloy in the atomizing chamber and not the conditions in the spray chamber.

The spraycasting method of making metallic articles continues to suffer from disadvantages that the sprayed deposit includes entrapped argon or other gas that increases porosity of the deposit, that cylindrical spray cast shapes exhibit fissure porosity proximate the inner diameter, and that yields of acceptable spraycast articles are unsatisfactorily low from a commercial production standpoint. Moreover, coarse grain banding is evident in the spraycasting of certain nickel base superalloys, such as IN718.

SUMMARY OF THE INVENTION

The present invention has an object to provide a spraycasting method that overcomes these disadvantages by using spray chamber pressure control technique to provide better thermal control of an atomized spray in flight in the spray chamber and of the sprayed material deposited on a collector in the spray chamber.

The present invention provides in one embodiment a pressure control technique that involves in-situ evacuation of the spray chamber during spray deposition of the atomized metal or alloy on the collector to maintain an inert or non-reactive gas partial pressure no greater than about 400 torr in the spray chamber, preferably a gas partial pressure of from about 10 to less than about 400 torr. Such low spray chamber gas partial pressure provides a higher temperature of the atomized spray in flight in the spray chamber and of the sprayed material deposited on the collector in the the spray chamber. In addition, the amount of entrapped gas in the deposit is reduced as compared to that present in a deposit sprayed at near atmospheric pressure.

In another embodiment of the present invention, the atomized spray of molten metal or alloy is generated by supplying a melt to an atomizing device using atomizing gas, such as argon or other gas inert or non-reactive to the melt, to atomize the melt and direct it as a spray of molten droplets into the spray chamber having an initial (backfilled) inert or non-reactive gas partial pressure of about 400 torr or less therein. Thereafter, the gas partial pressure in the spray chamber is maintained at about 400 torr or less during spray deposition of the atomized spray on the collector by in-situ evacuation of the spray chamber to remove the atomizing gas introduced therein from the atomized spray. For spray cast articles, such as rings and tubes, having rotational symmetry, the collector can be rotated and moved in a single pass relative to the atomizing device to build up a spray deposit thereon.

The spraycasting method of the present invention using the aforementioned low gas partial pressure control technique to provide a higher temperature of the atomized spray and deposited material reduces entrapped porosity in the deposited material, reduces inner fissure voids proximate the collector surface during spray deposition, and provides a uniform grain size across the thickness of the tubular spray deposit as a result of achievement of improved thermal equilbrium conditions in the deposit during spray deposition. Yields of acceptable spray cast components can be improved as a result.

The present invention also envisions a particular embodiment wherein the spray deposit surface is oriented at its leading edge region at a selected acute angle relative to horizontal to improve the quality of the spray deposit by reducing inner diameter fissure porosity. A particular embodiment to this end envisons orienting the collector surface itself at a selected acute angle to horizontal. The present invention envisions in another embodiment actively heating the collector in-situ proximate the leading edge of the deposit at an initial depostion location. The collector is thermally insulated and capable of accommodating thermal expansion of the collector surface in still a further embodiment of the invention. In addition, the scan rate and distance of a scanning atomizer is slaved to the rotational speed of the collector in an additional embodiment of the invention such that actual atomizer dwell time (spraying time) is lessened as the collector rpm is increased.

These and other objects and advantages of the present invention will become more readily apparent from the following detailed description taken with the following drawings.

DESCRIPTION OF THE DRAWINGS

FIGS. 4A1 and 4B1 are photographs of as-sprayed IN718 nickel base superalloy material sprayed at 400 Torr and 730 Torr, respectively, on an approximately 20 inch diameter mandrel. FIGS. 4A2 and 4B2 are photomicrographs of the as-sprayed IN718 nickel base superalloy material sprayed at 400 Torr and 730 Torr, respectively, showing grain size and porosity. The preforms depicted in FIGS. 4A1 and 4B1 were sprayed at an angle of 0 degrees (see angle AA of FIG. 1; i.e. where the longitudinal axis of the collector is horizontal).

DETAILED DESCRIPTION OF THE INVENTION

Figure 1:
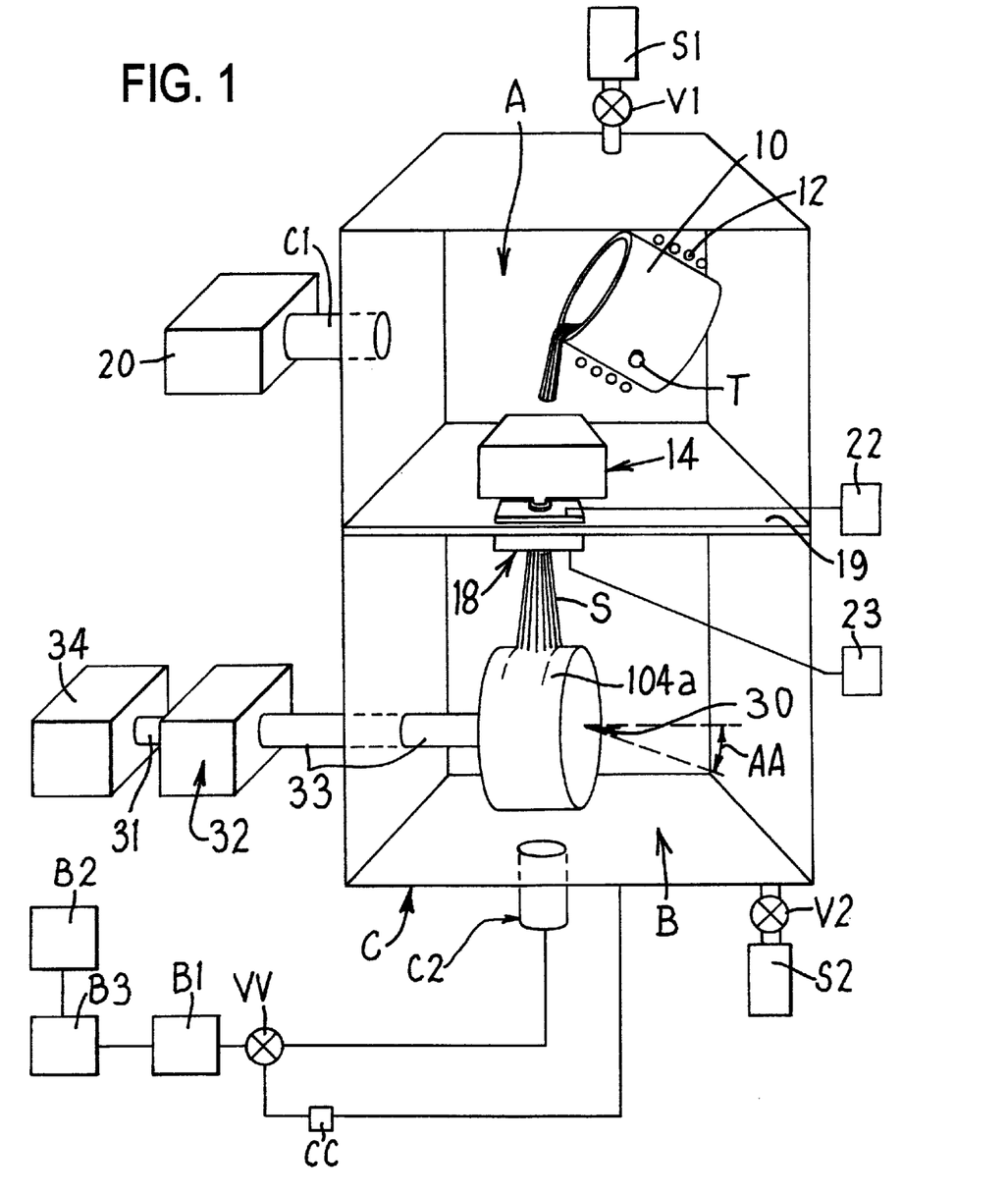
FIG. 1 is a schematic perspective view of apparatus in accordance with an embodiment of the invention for practicing the low gas partial pressure control technique of the invention.
Figure 2:
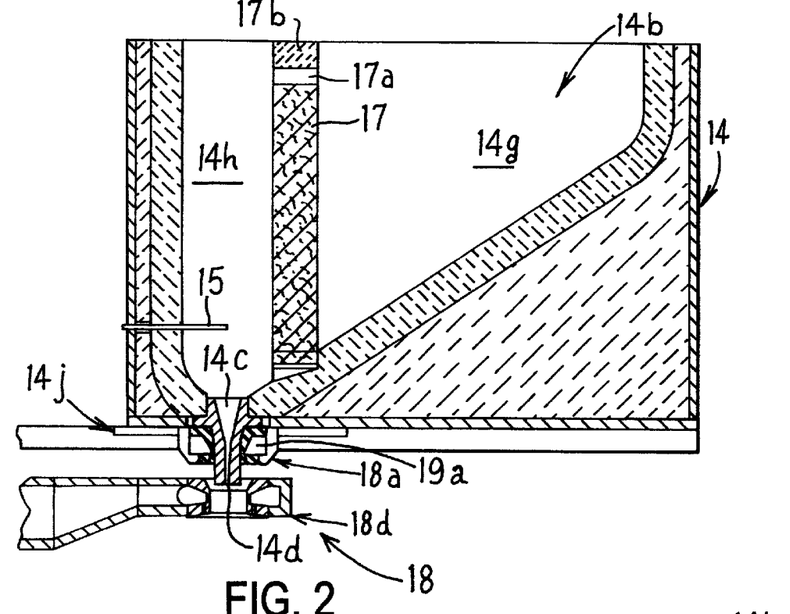
FIGS. 2 and 2A are sectional view of an atomizer and tundish for practicing the invention.

Referring to FIG. 1, apparatus is schematically illustrated for spraycasting using the pressure control technique in accordance with an embodiment of the present invention. The apparatus comprises a vacuum melting chamber A and a spray chamber B in a walled chamber C. Disposed in the melting chamber A is a refractory crucible 10 in which a metal or alloy charge is melted by induction melting using induction coil 12 disposed about the crucible. The crucible 10 can be tilted about a crucible trunion T as shown to pour the metal or alloy melt at a proper superheat temperature into a refractory tundish 14. As shown in FIGS. 1–2, the tundish 14 includes a melt holding chamber 14b and a refractory melt discharge nozzle 14c defining a melt discharge orifice 14d (typical diameter of 0.250–0.300 inch such as 0.292 for IN 718 melt). Melt is discharged from the orifice 14d to an underlying atomizer means 18 disposed beneath the intermediate wall 19 separating the melting chamber A and the spray chamber B. The tundish functions to filter and control flow rate of the metal.

The melting chamber A is communicated by conduit C1 to a conventional vacuum pump 20 that can evacuate the melting chamber A to very low vacuum levels, such as less than or equal to 10 micron Hg, prior to induction melting of the charge in the crucible 10. In this way, oxygen, nitrogen and other gases that could contaminate and/or react with the melt are removed from the chamber A prior to and during melting.

For purposes of illustrating the invention and not limiting it, spraycasting of a known nickel base superalloy IN 718 begins with charging the crucible 10 with bar stock of the IN 718 superalloy in the appropriate quantity needed. The crucible 10 comprises an alumina lined crucible that is substantially non-reactive with the melted IN 718 superalloy. The solid charge of the IN718 superalloy is induction melted in the crucible 10 by energizing the induction coils 12. The IN 718 melt is heated to an appropriate superheat above the alloy melting point (e.g. plus 200 to 300 degrees F. such as for example plus 300 degrees F. for IN 718 superalloy melt) prior to pouring. The melt temperature is measured by an infrared radiation (IR) pyrometer. Once the melt is stablized at the superheat temperature, both the melting chamber A and spray chamber B are backfilled with a partial pressure of inert or non-reactive gas to a level less than or equal to about 400 torr via gas discharged from atomizer 18 to be described or from gas sources S1 and/or S2, such as high pressure cylinders or bottles of inert (e.g. argon) or non-reactive gas, and valves V1, V2. Sources S1, S2 can be combined into a single gas source to this end to provide the gas to chambers A, B. Then, the superheated melt is poured into preheated tundish 14.

The tundish 14 includes an upstanding reticulated ceramic (zirconia) filter 17 having for example 10 to 20 pores per inch that divides the tundish melt holding chamber 14b into a pour chamber 14g that receives the melt from the crucible 10 and a quiescent chamber 14h that is disposed above the melt discharge nozzle 14c to supply quiet melt thereto. The filter 17 acts to filter the alloy melt as it moves from pour chamber 14g to quiescent chamber 14h where the melt enters the melt discharge nozzle 14c and to diffuse turbulence from the pour chamber to the quiescent chamber. A thermocouple array 15 in the tundish records the tundish metal temperature during a spray run.

The filter 17 is held fixed in lateral position in the tundish as shown by the filter width dimension being received in a cast-in complementary slot in the tundish and is held down vertically by a zirconia brick 17b. The filter 17 has an upper overflow channel 17a and a V-shaped bottom extending in a direction normal to the plane of the drawing with the apex of the shape cut off to promote drainage of the filter between pours of molten metal in the tundish and to concentrate drainage to this local filter region.

The melt poured from the crucible 10 into the preheated tundish 14 is discharged from the melt discharge nozzle 14c having nozzle heater 14j disposed therearound. Flow rate of the melt from the discharge orifice 14d is controlled by maintaining an appropriate in-tundish metal head level. A typical flow rate for IN 718 superalloy melt can be in the range of 75 to 95 pounds per minute. The melt discharged from the tundish discharge orifice 14d flows to the atomizer means 18.

Figure 2A:
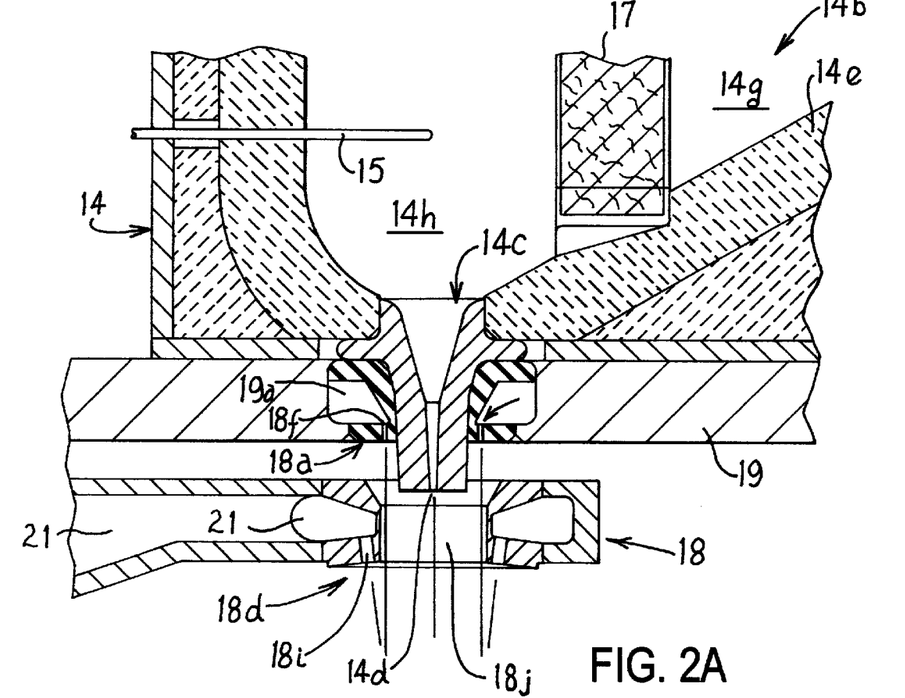

Atomizer means 18 shown in FIGS. 2 and 2A for atomizing the melt is of the type described in U.S. Pat. No. 4,779,802 and 4,905,899, the teachings of which are incorporated herein by reference with respect to atomizer construction. Atomizer means 18 comprises a static primary gas nozzle 18a disposed about the melt discharge nozzle 14c. The primary gas nozzle 18a uses a primary gas such as an inert gas (e.g. argon) at a pressure in the range of 30 to 60 psig supplied from manifold 19a to prevent splashback of the melt discharged from orifice 14d, a particular primary gas (argon) pressure for IN 718 melt being 35 psig for splashback prevention. The manifold 19a of the static gas nozzle 18a receives gas from a gas source 22 disposed outside the spray chamber B. The gas source can comprise conventional high pressure cylinders or bottles of inert gas, such as high purity argon, or other gas that is substantially non-reactive with the melt.

Atomizer means 18 also comprises a scanning gas atomizer 18d that receives the atomized melt from the primary nozzle 18a and uses an atomizing gas such as an inert gas (e.g. argon) at an atomizing gas pressure in the range of 70 to 140 psig supplied from a gas manifold 21 for melt atomization, a particular secondary atomizing gas pressure for IN 718 superalloy melt being 110 psig. The scanning atomizer 18d is termed a scanning atomizer because it oscillates in repeated cycles wherein each oscillation cycle includes oscillation through progressively increasing spray angles (relative to its vertical axis) as the collector 30 is axially moved and rotated at controlled rates relative to the atomizer 18d.

Figure 9A:
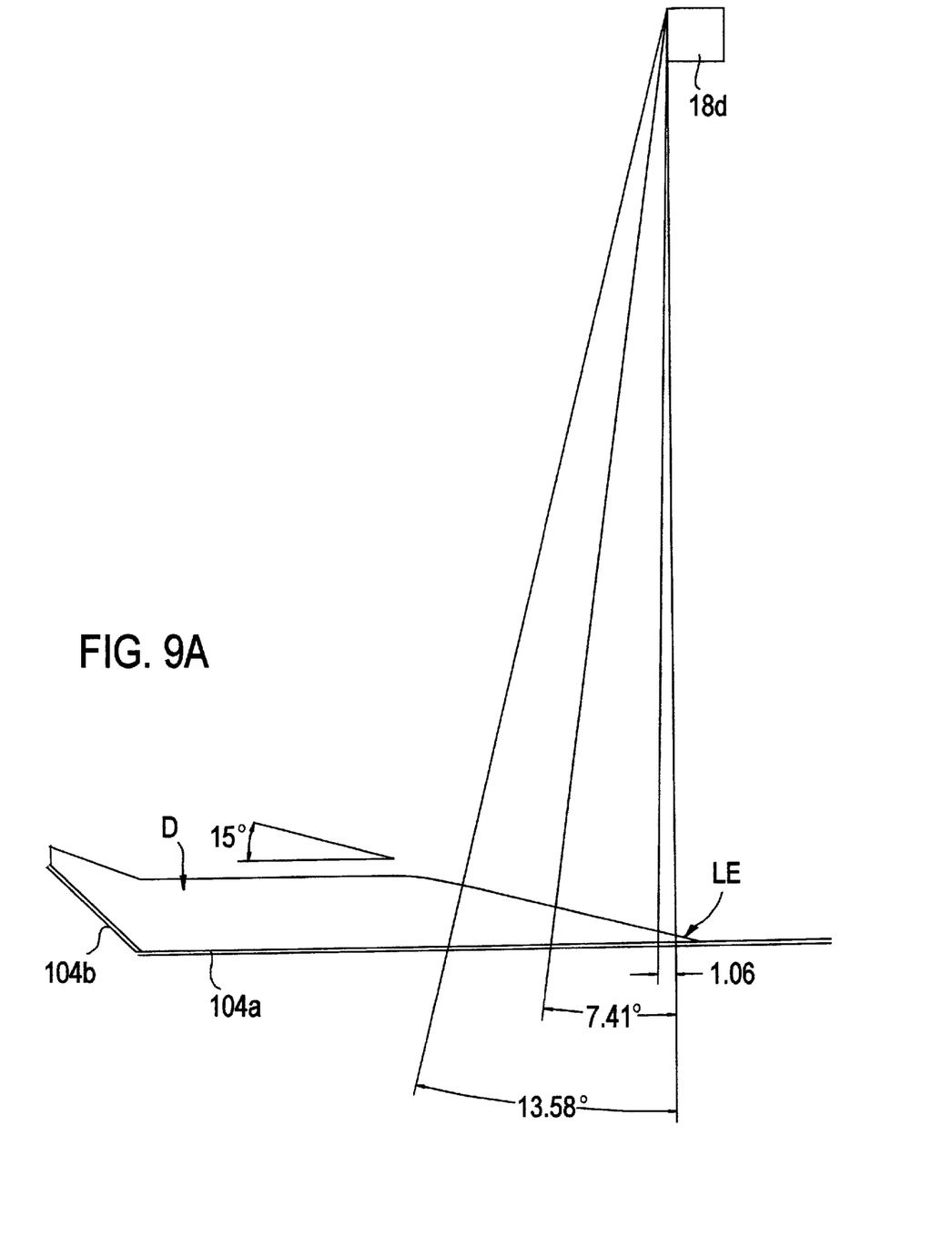
FIG. 9A illustrates the collector outer surface having a spray cast deposit thereon and the oscillation cycle comprising incremental spray angles of the atomizing nozzle.
Figure 9B:
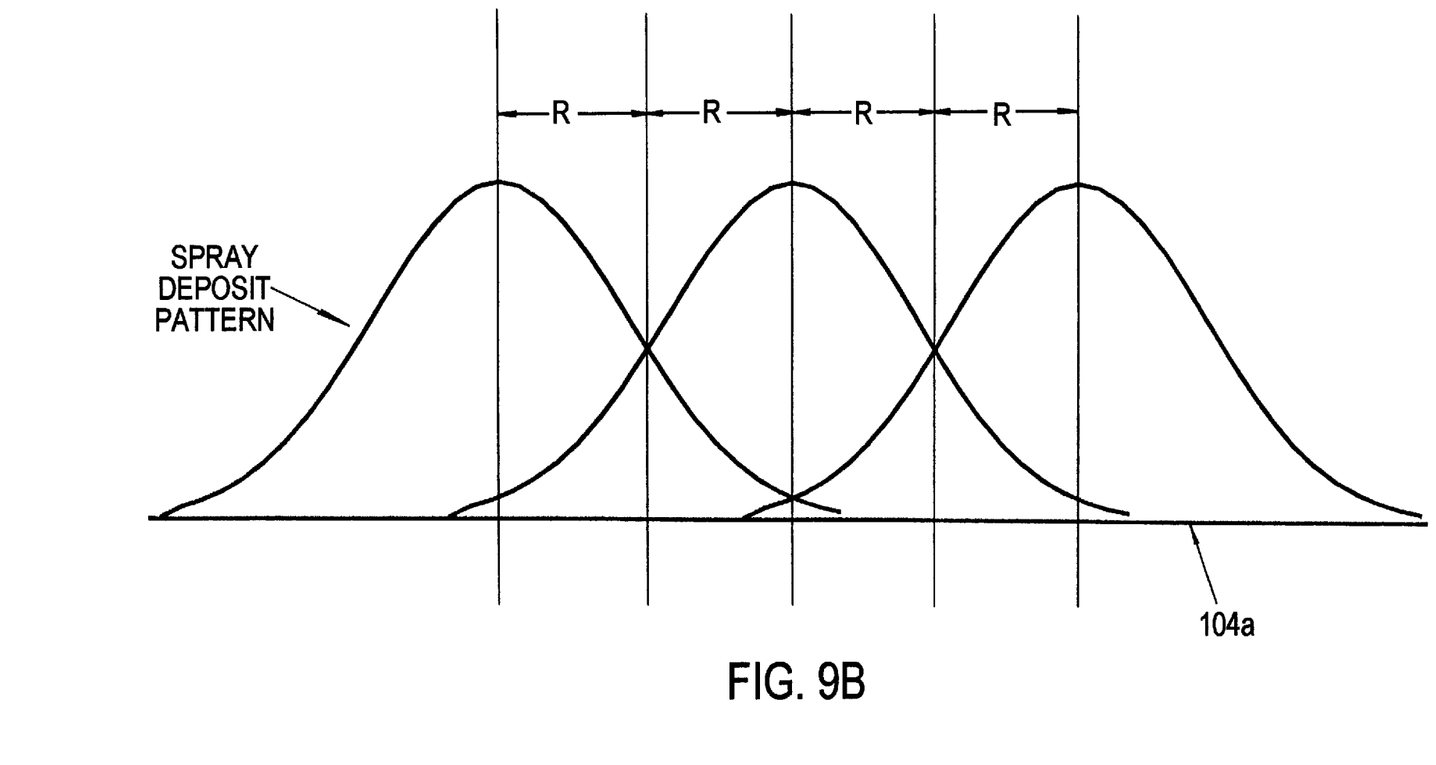
FIG. 9B illustrates the overlapping spray distribution collected on the collector outer surface as a result of the oscillation spray cycle.

For purposes of illustration only and not limitation, the atomizer 18d can be operated through repeated cycles wherein each cycle includes oscillation through an angle of about 1, 7, and 13 degrees per one revolution of the collector starting from the vertical axis of the atomizer, FIGS. 9A. That is, the atomizer 18d will oscillate through a 1.06 degree range relative to the vertical axis for one revolution of the collector 30, then oscillate through a 7.41 degree range for one revolution of the collector, and then oscillate through a 13.58 degree range for one revolution of the collector 30. This cycle is repeated as the collector 30 is moved axially from a start deposition position to a finish deposition position in a single pass to form the desired sprayed deposit as a preform on the collector. The scanning cycle of the atomizer 18d embodying increasing oscillation angles for each revolution of the collector serves to overlap the sprayed deposit as a pattern schematically illustrated in FIG. 9B in a uniform distribution over collector lengths limited only by the length of collector 30 in a single pass deposition operation; i.e. where the collector 30 is moved axially from right to the left in FIGS. 1 and 6 in a single pass relative to atomizer 18d to form the spray deposited preform on the collector surface 104a. In FIG. 9B, so-called "sweet spots" of the spray deposit are generally equally spaced by distance R from one another on the collector surface to form a generally uniform spray deposit having the leading edge region shown oriented within 10 to 20 degrees (e.g. 15 degrees shown) to horizontal (or to an axis perpendicular to the spray axis of the atomizing nozzle 18d in the event a non-horizontal nozzle/collector orientation is used).

The rpm of the collector 30 can be varied as a function of the outer diameter of collector surface 104a to minimize centrifugal stress on the spray cast deposit; e.g. so as not to exceed 20 psi. Oscillation of the atomizer 18d is slaved to the rpm of the collector 30 in that the approximate 1, 7, and 13 degree oscillation sequences will still occur over one revolution of the collector, regardless of the collector rpm, and then be repeated until the desired deposit is formed. The dwell time (spraying time) of each oscillation of the cycle thereby is lessened as the collector rotational speed (rpm) is increased.

The manifold 21 of the scanning atomizer means 18d receives atomizing gas from a gas source 23 disposed outside the spray chamber B. The gas source can comprise conventional high pressure cylinders or bottles of inert gas, such as high purity argon, or other gas that is substantially non-reactive with the melt.

The static gas nozzle 18a comprises a plurality (12) of gas discharge orifices 18f (diameter of 0.055 inch) spaced circumferentially about the melt discharge orifice 14d as shown in FIG. 2A. The scanning gas atomizer 18d comprises a plurality (24) of gas discharge orifices 18i (diameter of 0.1570 inch) spaced circumferentially about the atomizer spray opening 18j as shown in FIG. 2. The opening 18j and gas discharge orifices 18i of atomizer means 18 are relatively located effective to atomize the metal or alloy melt into a spray of fine molten droplets, an atomizer of use being described in U.S. Pat. No. 4,779,802 and 4,905,899, the teachings of which are incorporated herein by reference. The atomized metal or alloy spray S is directed at underlying mild steel substrate 104 of collector 30 disposed in the spray chamber B in the path of the spray S as shown in FIG. 1.

Figure 3:
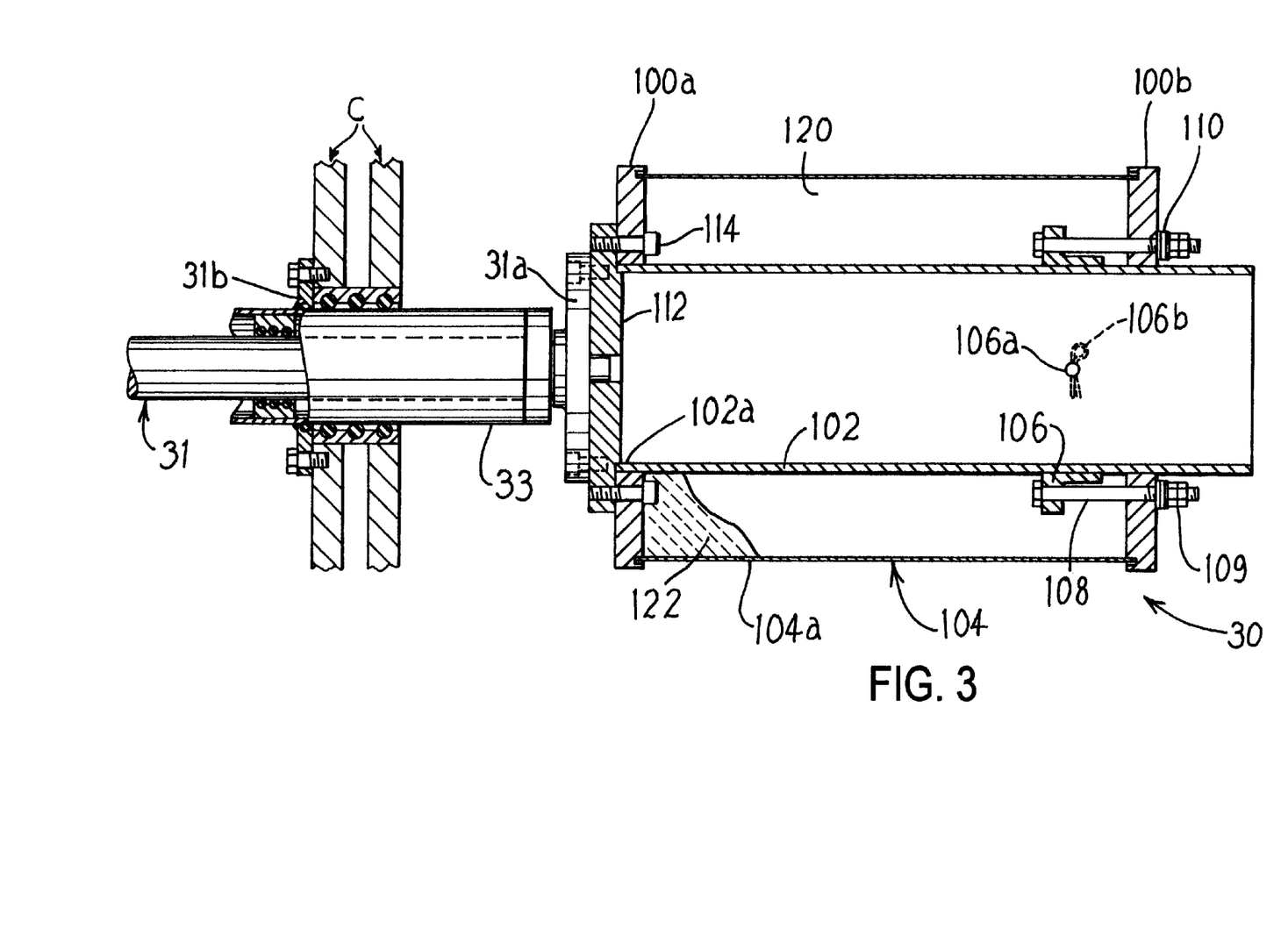
FIG. 3 is sectional view of a collector for the sprayed melt.

The collector 30 is mounted on double coaxial shaft mechanism, FIG. 3, that rotates the collector and also moves the collector axially from an axial start deposition position to an axial finish deposition position relative to the atomizer 18d. The inner shaft 31 rotates via the bearing assembly shown between shafts 31, 33 the collector while the outer shaft 33 mounts the collector 30 for axial motion relative to the atomizer 18d. A vacuum seal assembly 31b shown and bearing assembly shown are provided on the chamber double wall to this end. Rotary shaft 31 is driven in rotation by a AC servomotor 34. AC servomotor 34 and AC servomotor 32 are mounted on a common slide or carriage (not shown). AC servomotor 32 through a conventional ball/screw drive arrangement (not shown) drives the common slide or carriage on which motors 32, 34 are disposed for sliding motion together to impart axial motion to shaft 33 while shaft 31 rotates.

The collector 30 includes external collector substrate surface 104a shaped to impart a desired shape to the spraycast metal or alloy deposited on the collector. Typical standoff distance between the collector outer surface 104a and the atomizer 18d is from 23 to 29 inches such as 26 inches for spraying IN 718 superalloy melt.

The collector 30 can have a cylindrical outer collector surface 104a to form an annular or tubular deposit D having an inner and outer cylindrical collector surface 104a, such as required for a ring or tube. Alternately, the collector surface 104a can be configured as a tapered cone, FIG. 6, or any other shape to form the desired spray cast depsoit preform thereon.

In one embodiment of the invention, the collector 30 typically can be preheated prior to initiation of melt spraying by a static induction coil (not shown in FIG. 1). The power and time of the collector preheating vary as a function of substrate size and geometry with the final preheat temperature of the substrate typically being in the range of 1700 degrees F. to 1800 degrees F. for In 718 nickel base alloy. Alternately, the DC plasma arc torch described below can be used in lieu of such induction preheating. For the spraycasting of IN 718 superalloy, the collector can comprise mild steel, although other materials can be used for the collector depending upon the metal or alloy being spraycast.

Typical dimensions for a cylindrical collector outer surface 104a employed can include an outer diameter in the range of about 3.5 inches to 60 inches and a length of 60 inches having a usable spray length of about 56 inches.

The collector 30 is shown in more detail in FIG. 3 as having a hollow tubular structure that comprises a simple, low-cost construction, supports quick change manufacturing operations, permits insulation of the collector inner diameter, and accommodates thermal expansion of the collector. The collector 30 comprises axial substrate support end plates 100a, 100b and a stainless steel strongback 102 bearing the weight of the other collector components as well as concentrically positioning the end plates 100a, 100b and mild steel collector substrate 104 and its collector surface 104a relative to collector longitudinal axis. The strongback 102 is welded at its axial end 102a to hub 112. A tension ring 106 and respective ring bolts and nuts 108, 109 engaging the right hand end plate 100b in FIG. 3 hold the mild steel collector substrate 104 firmly in 360 degree annular grooves shown between the axial end plates 100a, 100b. The tension ring 106 is fastened to the strongback by a tension ring fastening pin 106a that extends through appropriate diametral holes (not shown) in the tension ring and strongback 102 and by retaining clips 106b that retain the fastening pins in position at their ends. The left hand support end plate 100a is fastened to hub 112 by screws 114. The hub 112 in turn is fastened to an end hub 31a of the rotary shaft by a splne and bolt connection shown for rotation thereby. A vacuum o-ring pack assembly 31b provides a seal at the shaft 33.

The diameters of the end plates 100a, 100b can be different to provide a tapered collector outer surface profile, FIG. 6, in which the outer diameter of the substrate 104 decreases from one end to the other, or vice versa.

Between the nuts 109 of the tension ring bolt 108 and the adjacent, outwardly facing surface of end plate 100b are positioned respective graphfelt (compressible) washers 110 which function to allow the collector substrate to elongate as it is preheated and while receiving a hot metal spray deposit. This thermal expansion accommodation mechanism preserves the dimensional integrity of the collector.

Figure 8A:
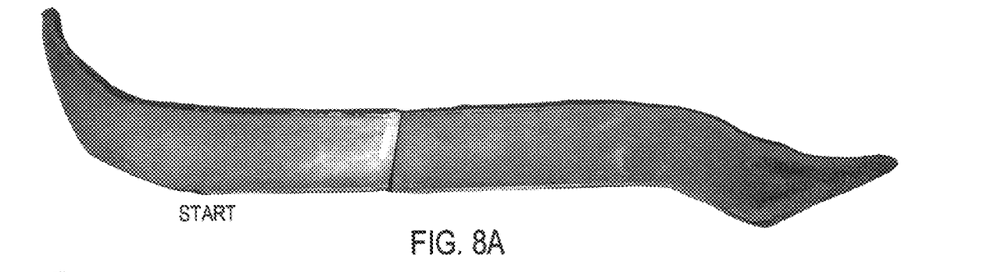
Figure 8B:
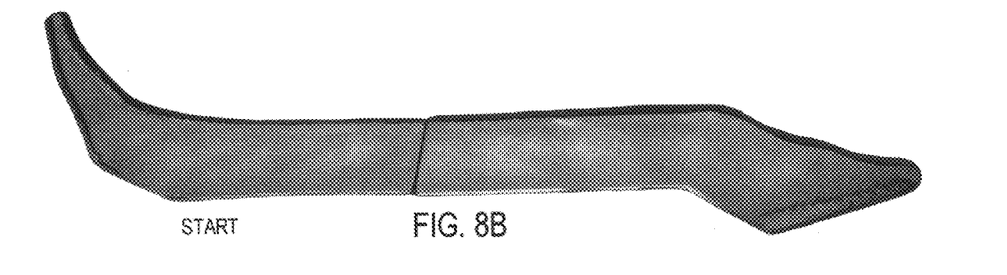

Annular space 120 between the outer diameter of the strongback 102 and the inner diameter of the collector substrate 104 is filled with thermal insulation 122 (partially shown), such as Kaowool insulation, which helps to maintain the temperature of the substrate 104 to a sufficient degree to reduce or eliminate inner diameter fissure porosity during the spraying process; e.g. compare upper preform of FIG. 8A sans insulation with lower preform of FIG. 8B with insulation.

The collector 30 is rotated relative to the atomizer 18 during deposition of the spray S thereon by the drive motor and shaft 31 connecting the motor and collector 30. The spray S thereby can be deposited around the entire periphery or circumference of the collector outer surface 104a. The speed of rotation of the collector 30 typically is in the range of 100 to 200 rpm for IN 718 melt at a flow rate of 75 to 95 pounds per minute. The speed of collector rotation is dictated by the allowable centrifugal stress on the deposit; e.g. to maintain the centrifugal stress to not exceed about 20 psi. As mentioned hereabove, the atomizer 18d oscillates through repeated cycles each comprising approximate 1, 7 and 13 degree oscillation for each revolution of the collector 30 as it is rotated and moved axially until the deposit is built up along the desired length of the collector.

Figures 7A, 7B:
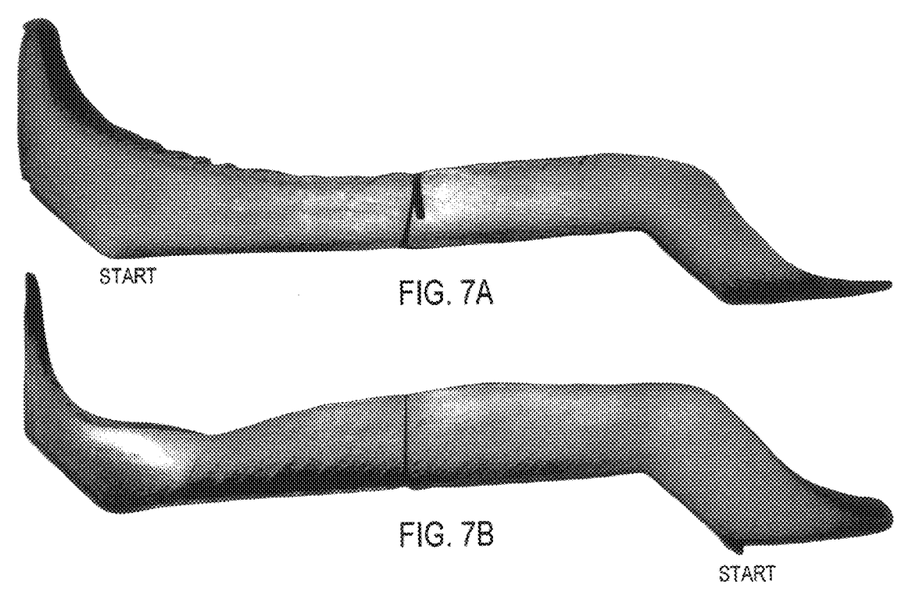
FIGS. 7A, 7B are photographs of as-sprayed IN718 nickel base superalloy material sprayed at 730 Torr on an approximately 20 inch diameter tapered collector surface at an angle of 45 degrees, FIG. 7B, (see angle AA of FIG. 1) as compared to FIG. 7A of 25 degrees, wherein the central regions of the deposits were at 45 and 25 degree angles, respectively, for FIGS. 7A and 7B FIGS. 8A, 8B are photographs of as-sprayed IN718 nickel base superalloy material sprayed at 400 Torr on an approximately 20 inch diameter tapered collector surface at an angle of 25 degrees (see angle AA of FIG. 1), wherein the central regions of the deposits were at 25 degree angles for FIGS. 8A, 8B. The spray deposits in FIGS. 4B, 7 and 8 are shown cut into two pieces after spraying.

The collector preferably includes an angled peripheral "start" surface region 104b typically disposed proximate collector end plate 100a at which surface region spraying of the atomized metal or alloy is started. The angled surface region 104b helps to catch sprayed material and form a "quick" build up of material at the region 104a (see FIG. 4 and "start" in FIGS. 7 and 8) and conservation of material in the part envelope region. That is, without the collector region 104b, there will be a fall off or tapering off of the deposited material in a manner that is not useful to form the component, thus providing wasted material deposited on the collector. The surface region 104b can be disposed to also shield collector end plate 100a from molten metal spray. A similar angled surface region (not shown) can be provided proximate an opposite end plate 100b or other region of the collector 30 as for example was used to form the end region features of the deposits shown in FIGS. 7 and 8.

In the practice of the invention, the spray chamber B is communicated by conduit C2 disposed opposite from the atomizer 18d to a vacuum pumping system that is capable of evacuating the spray chamber B at a high enough rate in order to maintain a selected low gas partial pressure (e.g. argon gas partial pressure when argon is the gas discharged from static atomizer 18a and scanning atomizer 18d) in the spray chamber B during spraycasting of the spray S onto the collector 30. That is, the vacuum system must be capable of exhausting the argon gas from the spray chamber B at a rapid enough rate to maintain the selected low gas partial pressure in the spray chamber while the spray S is directed at and deposited onto the collector 30. Preferably, the gas partial pressure in the spray chamber B is maintained at about 400 torr and below down to about 10 torr. The gas partial pressure in chamber B is maintained from about 250 to less than 400 torr using the vacuum system described below for spraycasting of superalloy melts, such as IN 718 superalloy melt.

A suitable vacuum pumping system to achieve such gas partial pressure levels in the spray chamber B comprises first and second stage blowers (pumps) B1, B2 in series with an intercooler B3 disposed between the blowers to lower the heat of compression. The 1st stage blower B1 is a commercially available Stokes HPB 622 blower, while the 2nd stage blower B2 is a commercially available Hibbon SIAV 25 blower. When tied together, the 1st and second stage blowers B1, B2 provide enough vacuum to overcome the atomizing gas flow at 110 psi (i.e. approximately 900 cubic feet per minute) in the spray chamber B during spray deposition and maintain the spray chamber B at a vacuum typically of 200 torr or less than 400 torr during spray deposition. The vacuum level in the spray chamber B is preset into a proportional integrative derivative controller CC (e.g. UDC 3000 controller from Honeywell Inc.) that automatically controls a modulation valve VV between the blowers B1, B2 and the spray chamber B.

Prior to the atomized spray S being directed into the spray chamber at the collector 30, the spray chamber B is initally evacuated to less than about 1 micron in concert with evacuation of the melting chamber A by vacuum pump system 20 to remove oxygen, nitrogen and other unwanted gases. After the alloy is melted in crucible 10 under hard vacuum, the chambers A, B are backfilled with inert (e.g. high purity argon) or non-reactive gas in a range less than or equal to about 400 torr gas partial pressure. The backfill gas is provided from the atomizer 18 or gas source S1 and/or S2, such as high pressure cylinders or bottles of high purity inert or nonreactive gas, via valves V1 and/or V2. A single common gas source (not shown) can be provided for the chambers A, B to this same end via a common valve (not shown). After the spray chamber B is backfilled with inert or non-reactive gas partial pressure in the range less than or equal to about 400 torr, the melt is teamed or supplied to the atomizer 18 through the tundish 14, and the atomized spray S is directed at the preheated collector 30 for deposition thereon as a spraycast deposit with typical deposit thicknesses being in the range of 0.5 inch to 4.0 inches. The collector 30 is rotated and moved axailly relative to atomizer 18d in a single pass to deposit the sprayed material to form the desired preform shape on the collector surface 104a.

A typical ratio of atomizing gas-to-metal flow rate ratio used in practicing the invention especially for spray casting nickel base superalloys such as IN 718 is approximately 1.2 to 1, although the invention is not limited in this regard. An advantage of the invention is that the quality of the sprayed deposit does not appear to be as critically tied to gas to metal ratio as it is when the spray pressure in spray chamber B is near atmospheric.

As mentioned above, the collector 30 is rotated while the spray S is scanned at the collector 30 by scanning atomizer 18d in repeated cycles each including oscillation at approximate 1, 7, and 13 degrees. While the spray S is being directed at and deposited on the collector 30, the vacuum pumps B1, B2 are operable to maintain the gas partial pressure (e.g. argon partial pressure if argon is the atomizing gas) at a low level preferably from about 10 torr to no greater than about 400 torr.

Figure 6A:
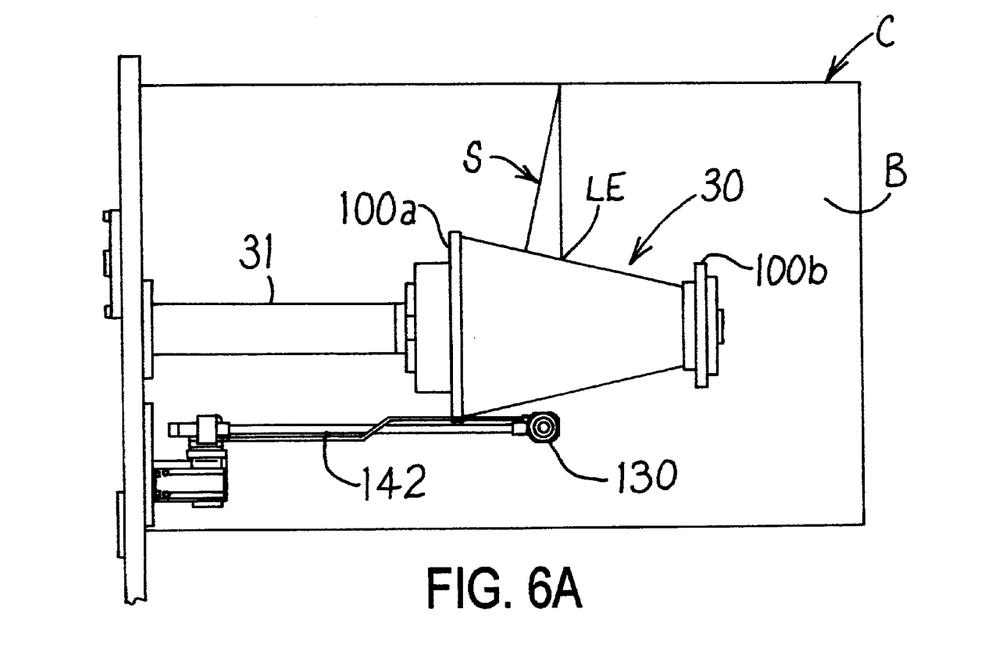
FIG. 6A is a side elevational view of a DC plasma heating torch useful in practicing an embodiment of the invention.
Figure 6B:
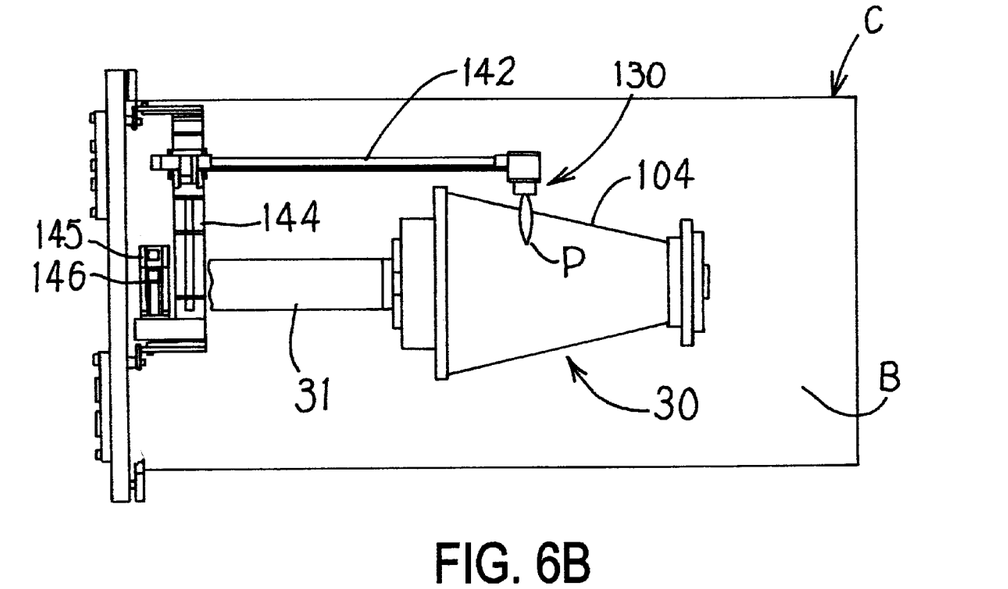
FIG. 6B is a plan view of the preheat torch of FIG. 6A.
Figure 6C:
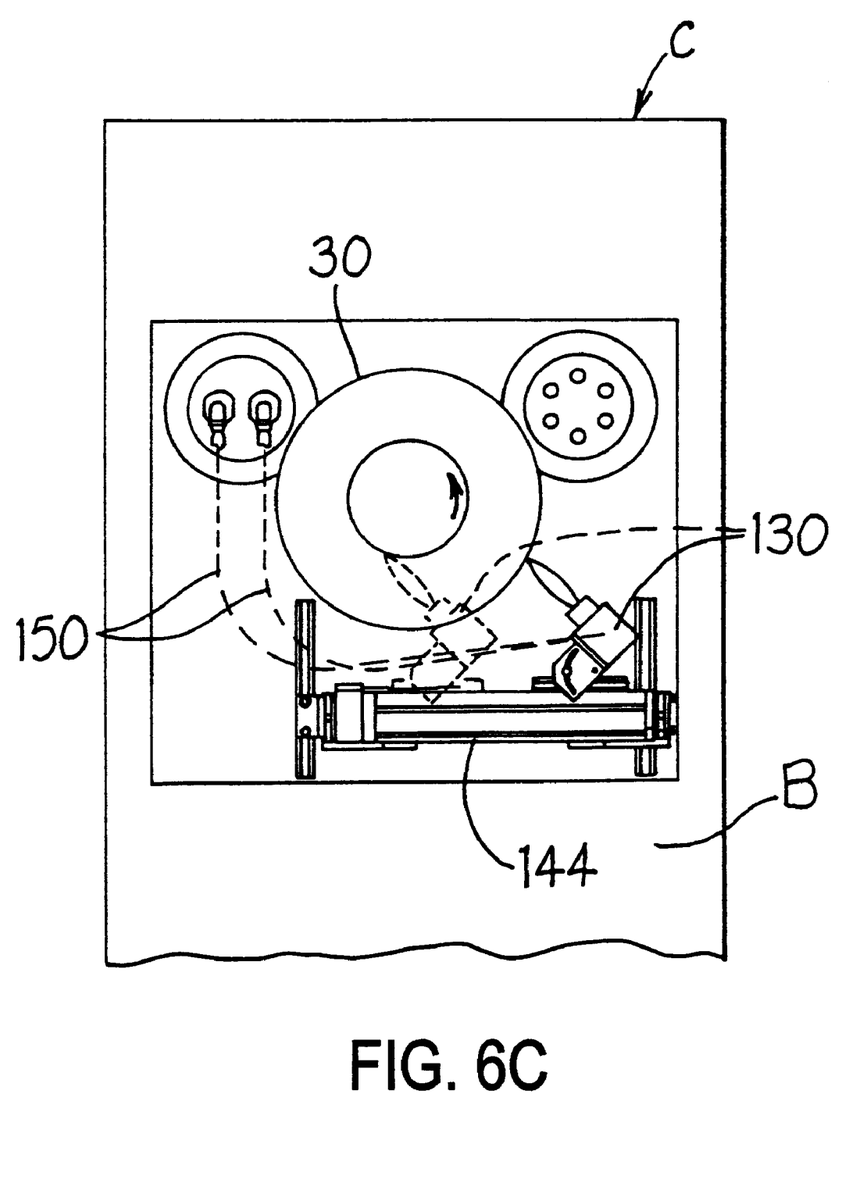
FIG. 6C is an end elevational view of the preheat torch of FIG. 6A.

In one embodiment of the invention, the collector 30 is preheated during spraying by a DC plasma torch or gun 130, FIGS. 6A, 6B, and 6C. In particular, a low pressure DC arc plasma preheat torch or gun is shown to actively heat the collector surface 104 just ahead of the leading edge LE of the deposit as it is formed; i.e. to provide an active in-situ substrate heating during deposition. The torch or gun 130 heats the substrate 104 just ahead of the deposit to 1) increase the bond between the deposit and substrate 104, 2) reduce inner diameter fissure prosity by maintaining a 1700 to 1800 degree F. deposit-to-interface thermal profile, and 3) allow for the focus of thermal energy at the leading edge of the deposit where the thermal energy is needed to these ends. The in-situ preheat of the collector substrate 104 by torch 130 in combination with the collector construction used having thermal insulation 122 yield a consistent inner diameter thermal profile with an attendant elimination of inner diameter fissure prosity in the deposit. The DC plasma arc torch or gun 130 comprises a typical conventional argon plus helium plasma gun typically used in vacuum plasma spray applications. The torch or gun is water cooled via suitable water lines 150 shown connected to the gun 130 and receives suitable plasma gas via suitable gas lines (not shown) connected to the gun.

Alternately, the aforementioned induction preheating technique can be used to heat the collector; however, induction preheating may only be used to preheat the collector prior to start of spraying whereas the DC plasma source technique can be used prior to and during the spraying.

The torch or gun 130 is mounted on a slide mechanism shown in FIGS. 6a, 6B, and 6C residing in the spray chamber B. The slide mechanism carries a boom 142 which is part of the torch assembly. The boom 142 is carried on a slide 144 which is movable by servomotor 145 and ball/screw mechanism 146 in a direction parallel to the diameter of the collector 30 to permit the torch plume P to adjust in radial dimension to the profile of the sprayed deposit to be built up on the substrate surface 104 during spraying; e g. see FIG. 6C.

The torch 130 and collector 30 initially are positioned at the start deposition position on the collector 30 by axial movement of the double shaft mechanism. The torch 130 can be adjusted such that plasma plume is directed normal to the collector substrate surface 104a or at an angle thereto using a tapered collector surface as described. As the collector 30 is moved axially (from right to left in FIG. 6B) during deposition, the plasma plume is directed just ahead of the deposit leading edge LE for the purposes described hereabove.

In spray casting, the present invention envisions selecting the angle of leading edge region LE of the spray deposit, FIG. 9A, to be at an acute angle to an axis perpendicular to the spray axis of the atomizing nozzle 18d to reduce inner diameter fissure porosity regardless of pressure in the spray chamber. This can be achieved by proper adjustment of the oscillation angles of the atomizing nozzle 18d. Alternately or in addition, the collector outer surface 104a (or alternately angle of the longitudinal axis of collector 30) can oriented to be off-horizontal to this end. For example, the angle AA, FIG. 1, of the collector surface 104a can be selected to be from 10 to 30 degrees such as 25 degrees relative to horizontal (or other acute angle to horizontal) to improve the quality of the spray deposit by reducing inner diameter fissure porosity. When the angle AA of the collector surface 104a is 45 degrees or 0 degrees relative to horizontal, spray cast IN 718 deposits on the collector 30 may be produced which have less than optimized inner diameter porosity; e.g. compare FIGS. 4A, 4B (0 degree angle AA) and FIG. 7B (45 degree angle AA of tapered collector surface 104a) versus FIG. 7A and FIG. 8A, 8B (25 degree angle AA of tapered collector surface 104a) in terms of inner diameter fissure porosity present in the deposit.

Adjustment of the angle AA of the collector surface 104a relative to horizontal can be effected by using a tapered collector substrate 104 as shown in FIG. 6. Alternately, the adjustment of the angle AA can be achieved by mounting the aforementioned double shaft mechanism and AC servomotors for the coaxial shafts 31, 33 in a manner to vary the angle of the shafts relative to horizontal to this same end.

After spraycasting, the deposited ring or tube typically of thickness from 0.5 to 4.0 inches is cooled in the spray chamber B under a relative vacuum. The spraycast ring or tube is removed from the collector 30 at ambient temperature and then can be hot isotatically pressed to densify the deposited ring or tube.

Maintaining of the low gas partial pressure in the spray chamber B in accordance with the invention provides improved control of the temperature of the atomized spray droplets in flight in the spray chamber B and of the atomized metal or alloy deposited on the collector 30 as well as in the reduction of as-sprayed porosity; e.g. see FIG. 4B2 having 2.1 volume % porosity at a spray pressure of 730 torr as compared FIG. 4A2 having 0.9 volume % porosity at a spray pressure of 400 torr. In effect, the spray chamber pressure control technique provides a higher temperature of the atomized spray droplets in flight in the spray chamber B and as deposited on the collector by reducing droplet thermal convection heat loss that otherwise can occur at higher spray chamber pressures and by allowing thermal equilbrium conditions to be established more quickly in the deposited metal or alloy on the collector 30.

Figure 4A:
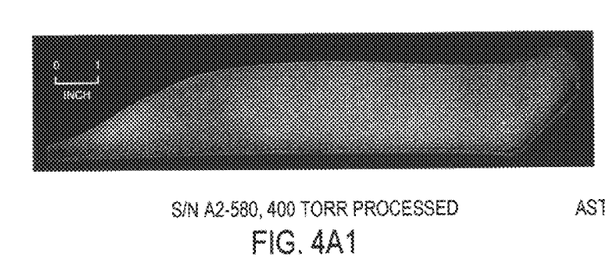
Figure 4A:
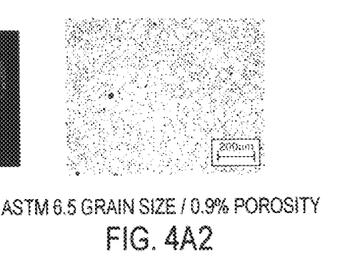
Figure 4B:
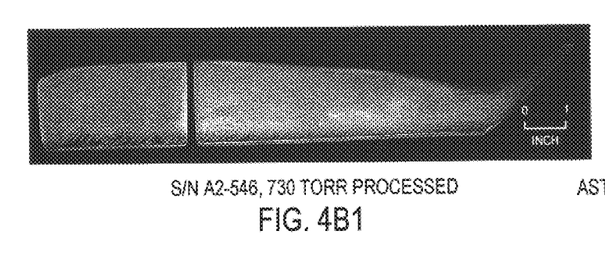
Figure 4B:
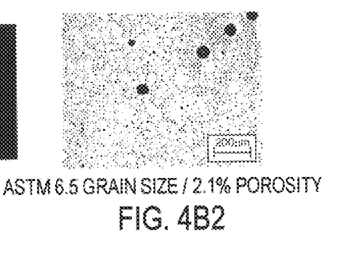

FIG. 4 illustrates the difference in spray-deposited IN 718 ring made at the low pressure (e.g. 400 torr) in spray chamber B pursuant to the invention, FIG. 4A1, versus a spray-deposited IN 718 ring made at much higher pressure (e.g. 730 torr) in spray chamber B, FIG. 4B1. In particular, the fissure porosity at the inner diameter (inner diameter of ring proximate the collector 30) and entrapped gas porosity within the ring deposit are both significantly reduced while the same uniform grain size (e.g. ASTM 6–6.5 grain size) is maintained in each ring microstructure without grain banding or layering.

FIG. 4A2 and FIG. 4B2 illustrate microstructures of the spray rings of FIGS. 4A1 and 4B1, respectively. Entrapped argon in the spray deposit pursuant to the invention is significantly reduced (e.g. 0.9 volume % porosity) as compared to entrapped argon in the spray deposit made at the higher 730 torr spray atmosphere (e.g. 2.1 volume % porosity). As a further example, entrapped argon in Waspaloy spray cast rings pursuant to the invention exhibit 0.5 ppm by weight Ar as compared to entrapped argon of 1.5 ppm by weight Ar in Waspaloy spray cast rings spray cast near atmospheric pressure in the spray chamber B.

Figure 5A:
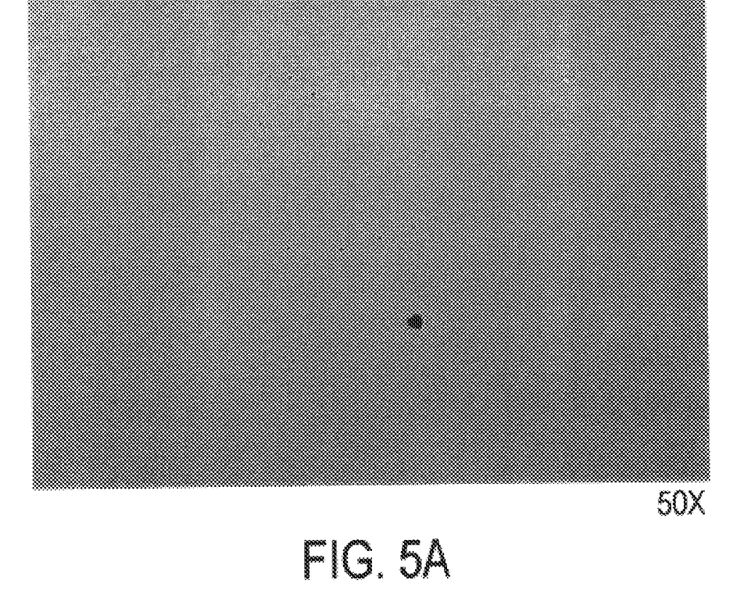
FIGS. 5A and 5B are photomicrographs of electron beam weld heat affected zones of hot isostactically pressed spraycast Waspaloy nickel base superalloy material sprayed at 400 Torr and 730 Torr, respectively, showing higher porosity at the weld heat affected zone for the sample sprayed at 730 Torr, FIG. 5B.
Figure 5B:
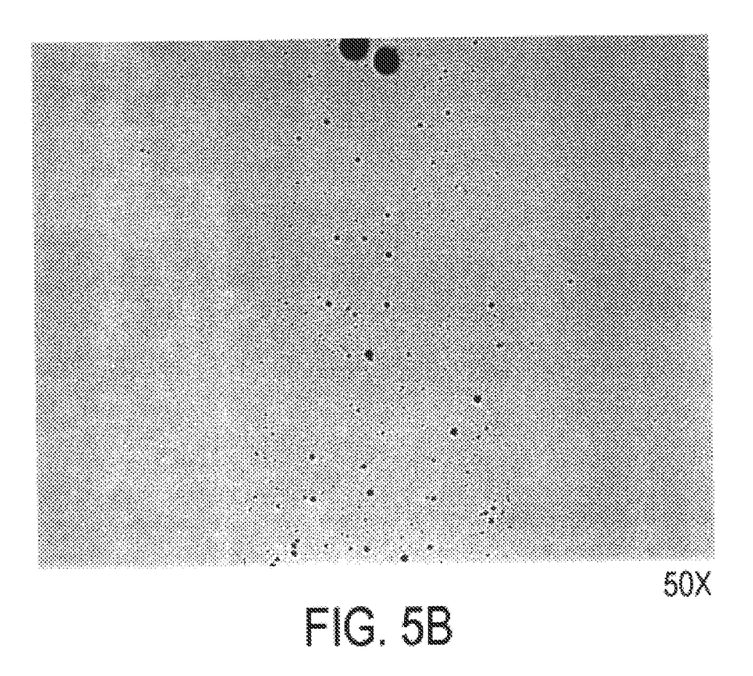

Moreover, FIG. 5 illustrates a lower electron beam weld porosity in a spray-deposited Waspaloy ring made at the low pressure (e.g. 400 torr) in spray chamber B pursuant to the invention, FIG. 5A, as compared to electron weld porosity spray-deposited Waspaloy ring made at much higher pressure (e.g. 730 torr) in spray chamber B, FIG. 5B.

The spray chamber pressure control technique reduces entrapped atomizing gas (as porosity) in the metal or alloy deposited on the collector 30, reduces fissure voids at the inner surface of the deposit immediately adjacent the collector outer surface 30a, and provides a substantially uniform grain size across the thickness of the deposit on the collector 30 as a result of improved thermal equilbrium conditions established in the deposit during spray deposition. Still further, larger diameter ring or tube deposits can be built up on the collector 30; e.g. deposits having a diameter greater than about 30 inches while avoiding grain layering or banding in the deposit can be achieved.

Spraycasting at 400 torr or less pursuant to the invention versus 730 torr as used heretofore also allows for scalability of the method and apparatus to make larger diameter preforms (deposits) as the convective cooling is lessened with an attendant increase in spray and deposit temperature. Higher spray/deposit temperatures allow for spraying larger diameter preforms at slower rotational speeds (i.e. reduced centrifugal stresses) while maintaining acceptable thermal profiles even at the larger diameters effective to reduce inner diameter fissure porosity and broaden the processing window.

Spraycasting at 400 torr or less pursuant to the invention reduces inner diameter fissure porosity, reduces entrapped gas in the deposit, and broadens the processing window to produce a variety of component shapes and sizes with uniform deposit microstructure. Further, control of the substrate angle pursuant to an embodiment of the invention also reduces inner diameter fissure porosity and and broadens the processing window to produce a variety of component shapes and sizes with uniform deposit microstructure. Use of the scanning atomizer cycle described above, of the thermally insulated collector, and DC plasma arc torch pursuant to other embodiments of the invention also reduce inner diameter fissure porosity and and broaden the processing window to produce a variety of component shapes and sizes with uniform deposit microstructure.

The present invention thus can produce spray deposited rings and tubes having reduced inner diameter fissures and porosity as compared to spray deposition at the higher (e.g. 730 torr) pressure while retaining uniform grain size across the thickness of the spray deposit with no grain banding.

Although certain embodiments of the invention have been shown and described in detail, it should be understood that variations and modifications may be made thereto without departing from the spirit and scope of the invention as set forth in the appended claims.

We claim:

1. A method of making a superalloy article, comprising:
    directing an atomized superalloy spray atomized by an atomizing gas at a collector disposed in a spray chamber,
    controlling temperature of the spray in flight in the spray chamber and of the atomized superalloy spray as it is deposited on the collector by evacuating the spray chamber as the spray is directed at the collector to remove the atomizing gas using a vacuum pumping system communicated to said spray chamber and effective to provide a gas partial pressure in the spray chamber of about 200 torr to about 400 torr during spraying to provide a deposit with reduced fissure porosity proximate said collector with a substantially uniform grain size through a thickness of said deposit, and
    collecting the spray on the collector to build up a deposit forming an article.

2. The method of one of claim 1 wherein the gas partial pressure is maintained between about 250 and less than 400 torr as the spray is directed at the collector.

3. The method of claim 1 further including controlling temperature of the spray in flight in the spray chamber and of the atomized super alloy as it is deposited on the collector to reach thermal equilbrium in the deposit on the collector from an inner region to an outer region such that grain layering or grain banding is reduced in the deposit.

4. The method of claim 1 further including controlling temperature of the spray in flight in the spray chamber and of the atomized super alloy as it is deposited on the collector to reach thermal equilbrium in the deposit on the collector from an inner region to an outer region such that a substantially uniform grain size is provided between said inner region and outer region.

5. The method of claim 1 further including controlling temperature of the deposit by heat retention in the deposit by virtue of its thickness.

6. The method of claim 1 including collecting the spray on the collector to build up a deposit having a tubular wall thickness greater than about 2 inches and avoiding grain layering or banding in the deposit.

7. A method of making a superalloy article, comprising:
    atomizing a superalloy melt by an atomizing gas that is inert or non-reactive to said superalloy,
    directing the atomized superalloy spray at a collector disposed in a spray chamber having an initial inert or non-reactive gas partial pressure equal to or less than about 400 torr therein,
    evacuating the spray chamber as the atomized superalloy spray is directed at the collector to remove the atomizing gas using a vacuum pumping system communicated to said spray chamber and effective to provide a gas partial pressure in the spray chamber of about 200 torr to about 400 torr during spraying to provide a deposit with reduced fissure porosity proximate said collector with a substantially uniform grain size through a thickness of said deposit, and
    collecting the spray on the collector to build up a deposit forming an article.

8. The method of claim 7 wherein the gas partial pressure is maintained between about 250 and less than about 400 torr as the spray is directed at the collector to control temperature of the spray in the spray chamber effective to reduce porosity of the deposit on the collector by virtue of reducing entrapped gas.

9. The method of claim 8 wherein the gas partial pressure is maintained between about 250 and less than about 400 torr as the spray is directed at the collector to control temperature of the spray in the spray chamber effective to reduce fissures at an inner region of the deposit on the collector.

10. The method of one of claim 9 wherein the gas partial pressure is maintained between about 250 and less than about 400 torr as the spray is directed at the collector.

11. The method of claim 7 further including evacuating the spray chamber to control temperature of the spray in flight in the spray chamber and of the atomized super alloy as it is deposited on the collector to reach thermal equilbrium in the deposit on the collector from an inner region to an outer region such that grain layering or grain banding is reduced in the deposit.

12. The method of claim 7 further including controlling temperature of the spray in flight in the spray chamber and of the atomized super alloy as it is deposited on the collector to reach thermal equilbrium in the deposit on the collector from an inner region to an outer region such that a substantially uniform grain size is provided between said inner region and outer region.

13. The method of claim 7 including collecting the spray on the collector to build up a deposit having a tubular wall thickness greater than about 2 inches and avoiding grain layering or banding in the deposit.

14. A method of making a superalloy article, comprising:

directing an atomized superalloy spray atomized by an atomizing gas at a rotating collector disposed in a spray chamber, evacuating the spray chamber as the spray is directed at the collector to remove the atomizing gas using a vacuum pumping system communicated to said spray chamber and effective to provide a gas partial pressure in the spray chamber of about 200 torr to about 400 torr during spraying to provide a deposit with reduced fissure porosity proximate said collector with a substantially uniform grain size through a thickness of said deposit, and collecting the spray on the collector to build up a deposit forming an article.

15. The method of claim 14 wherein the gas partial pressure is maintained between about 250 and less than 400 torr as the spray is directed at the collector.

* * * * *